Oct. 13, 1953   J. C. SOUTER   2,655,583
WELDING ELECTRODE
Filed May 1, 1952

INVENTOR
J. C. SOUTER
BY
ATTORNEY

Patented Oct. 13, 1953

2,655,583

UNITED STATES PATENT OFFICE 2,655,583

WELDING ELECTRODE

John C. Souter, West Newbury, Mass., assignor to Western Electric Company, Incorporated, New York, N. Y., a corporation of New York Application May 1, 1952, Serial No. 285,425

4 Claims. (Cl. 219—4)

This invention relates to welding electrodes and more particularly to welding electrodes having a plurality of welding contact portions.

In welding one article to another at a single point, any particular type of welding contact may be employed. In certain instances it is desirable to make simultaneous welds at spaced positions on the articles and to be assured of satisfactory welds, the welding contacts must be capable of movement into engagement with their respective portions of the articles under given pressures.

An object of the present invention is to provide a welding electrode which is simple in structure yet highly efficient in performing a plurality of substantially lined welds simultaneously.

With this and other objects in view, the invention comprises a welding electrode with a plurality of welding contacts normally lying at spaced positions in alignment with each other, a support and suitable means interposed between the contacts and the support whereby the contacts may be moved into engagement with out-of-plane portions of an article.

Figure 1:
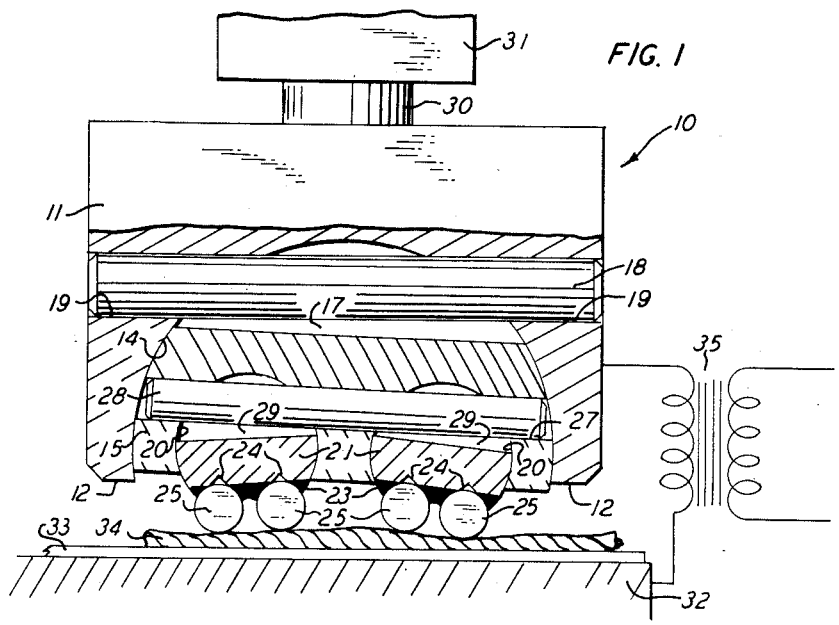
Figure 2:
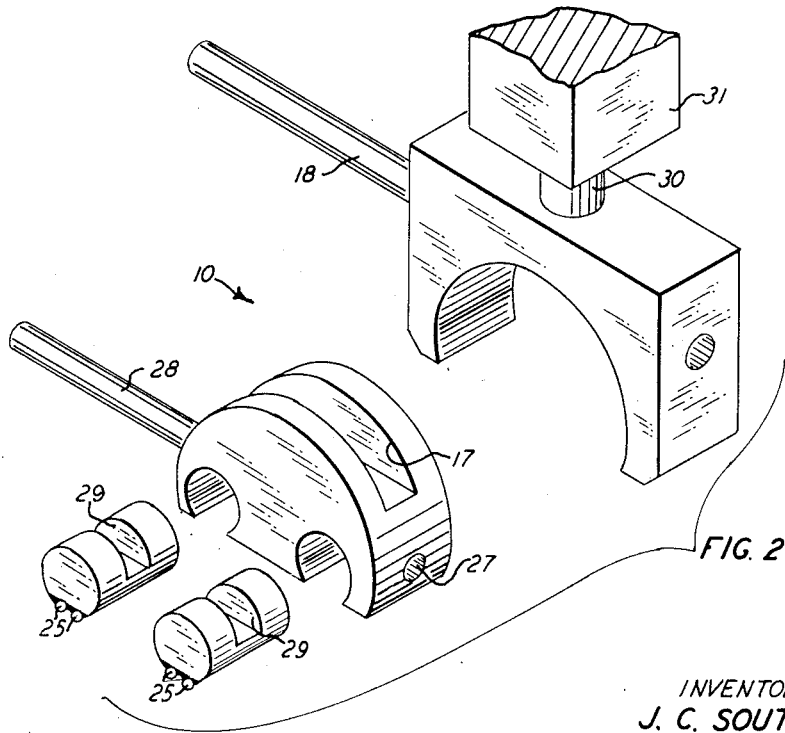

Other objects and advantages will be apparent from the following detailed description when considered in conjunction with the accompanying drawing wherein:

Fig. 1 is a vertical sectional view of the electrode shown in a welding apparatus with a companion electrode; and Fig. 2 is an exploded view of the electrode.

The electrode 10 includes a support 11 having a surface 12 and an aperture 14 larger than semicircular in cross-section, intersecting the surface 12 below the center line of the aperture. A member 15 substantially identical in contour to the cross-sectional contour of the aperture 14 is receivable in the aperture and although free to rock in the aperture, it will be held against vertical displacement by the walls of the aperture extending beyond the center thereof. The member 15 has a longitudinal groove 17 in its upper portion through which a retaining pin 18 extends, the pin being disposed in aligned apertures 19 in the support 11.

The member 15 has like spaced apertures 20 similar in cross-sectional contour to the cross-sectional contour aperture 14 yet smaller in size to receive elements 21. The elements 21 are substantially circular in cross-section having like flat surfaces 23 provided with pairs of parallel grooves 24 for positioning rod-like welding contacts 25 while being welded in place. The member 15 has an aperture 27 extending therethrough and through the apertures 20. A pin 28 positioned in the aperture 27 extends through the grooves 29 in the elements 21 to hold the elements against lateral displacement and permit them to rock freely in their apertures 20.

In the present embodiment of the invention, the electrode 10 has an integral projection 30 mounted in a reciprocable member 31 of a welding machine including a fixed position electrode 32 to support a strip of metal foil 33 to which a conductor 34 formed of a plurality of twisted wires, is to be welded at spaced positions. The welding circuit is shown schematically at 35.

Considering now the function of the electrode, Fig. 1 illustrates the irregular contour of the wire or article 34 which is to be welded to the metal foil or article 33 at a plurality of spaced positions. To produce satisfactory welds, it is necessary that the welding contacts 25 move into engagement with the portions of the articles to be welded under uniform pressures to suitably fuse the portions of the articles adjacent the contacts and supply the necessary pressure to bring about suitable joining of the fused portions of the articles and to eliminate arcing due to improper application of pressure to the contacts. It is apparent that if two or more welding contacts were mounted in a fixed plane relative to the support 11, only one out of the four welding contacts would perform a satisfactory weld under the conditions illustrated in Fig. 1.

Considering now one of the elements 21 with its two welded contacts 25 it will be apparent that, after one of the contacts engages the article to be welded, this particular element 21 may be rocked in its aperture 20 until the other contact is moved under a like pressure into engagement with its portion of the article. The same action takes place with the other element 21 and its contacts 25. However, due to the normal alignment of the welding contacts 25 or the normal positioning of these contacts in a common plane, it is necessary to provide each pair of contacts with a rockable support which constitutes the elements 21 disposed in their respective apertures 20. Furthermore, the present illustration discloses the need for the elements 21 to be positioned given distances from the fixed electrode 32 due to the irregular contour of the article 34 being welded. This condition is automatically compensated for in the mounting of the member 15 in its larger than semi-circular aperture 14. It, therefore, will be apparent that even if the contours of the articles 34 and 32 are irregular, the welding contacts 25 will find their respective portions and apply like pressures to produce uniform welds.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A welding electrode comprising a member having a surface and a circular aperture intersecting the surface short of the centerline of the aperture to provide inwardly extending supporting portions, an element substantially circular in cross-section supported for rocking movement in the aperture on the supporting portions of the member, and contacts mounted at spaced positions on the element outside the aperture to move with the element to engage spaced portions of an article to be welded.

2. A welding electrode comprising a member having a surface and a circular aperture intersecting the surface short of the centerline of the aperture to provide inwardly extending supporting portion, an element substantially circular in cross-section supported for rocking movement in the aperture on the supporting portion of the member, contacts mounted at spaced positions on the element outside the aperture to move with the element to engage spaced portions of an article to be welded, and means carried by the member to hold the element for free rocking movement but against lateral displacement.

3. A welding electrode comprising a support having a surface and an aperture larger than semi-circular in cross-section opening through the surface, a member having a cross-sectional contour substantially identical to the cross-sectional contour to the aperture supported for rocking movement in the aperture and having an outer surface and spaced substantially circular apertures the said surface of the member, rockable elements disposed in the apertures of the member, and spaced contacts mounted on the elements and adapted through the rockable movements of the elements and the member to engage spaced portions of an out-of-plane article to be welded.

4. A welding electrode comprising a support having a surface and an aperture larger than semi-circular in cross-section opening through the surface, a member having a cross-sectional contour substantially identical to the cross-sectional contour to the aperture supported for rocking movement in the aperture and having an outer surface and spaced substantially circular apertures the said surface of the member, rockable elements disposed in the apertures of the member, spaced contacts mounted on the elements and adapted through the rockable movements of the elements and the member to engage spaced portions of an out-of-plane article to be welded, and separate means to hold the member against displacement in the aperture of the support and to hold the elements against displacement in their apertures of the member.

JOHN C. SOUTER.

References Cited in the file of this patent

UNITED STATES PATENTS

| Number | Name | Date |
| --- | --- | --- |
| 1,996,901 | Burns | Apr. 9, 1935 |
| 2,346,088 | Shobert | Apr. 4, 1944 |